United States Patent
O'Dea et al.

(10) Patent No.: US 7,413,263 B2
(45) Date of Patent: Aug. 19, 2008

(54) MODULATOR NOISE REDUCTION VIA MOTOR CONTROL

(75) Inventors: Kevin Austin O'Dea, Ann Arbor, MI (US); Bryan T. Fulmer, Byron, MI (US); E. Wayne Lloyd, Lebanon, OH (US)

(73) Assignee: Delphi Technologies, Inc., Troy, MI (US)

( * ) Notice: Subject to any disclaimer, the term of this patent is extended or adjusted under 35 U.S.C. 154(b) by 574 days.

(21) Appl. No.: 10/761,257

(22) Filed: Jan. 21, 2004

(65) Prior Publication Data

US 2005/0156464 A1   Jul. 21, 2005

(51) Int. Cl.
*B60T 13/18* (2006.01)

(52) U.S. Cl. ............ 303/11; 303/113.4; 303/116.1

(58) Field of Classification Search ... 303/113.1–113.5, 303/116.1–116.4, 155, 10, 11
See application file for complete search history.

(56) References Cited

U.S. PATENT DOCUMENTS

| | | | |
|---|---|---|---|
| 4,872,730 A * | 10/1989 | Takagi et al. | 303/139 |
| 5,131,730 A * | 7/1992 | Kollers et al. | 303/113.2 |
| 5,487,593 A | 1/1996 | Potts et al. | |
| 5,547,265 A | 8/1996 | Harris et al. | |
| 5,620,241 A * | 4/1997 | Burgdorf | 303/186 |
| 6,113,197 A | 9/2000 | Kuroki et al. | |
| 6,158,825 A | 12/2000 | Schunck et al. | |
| 6,174,033 B1 * | 1/2001 | Busch et al. | 303/10 |
| 6,196,643 B1 * | 3/2001 | Yokoyama et al. | 303/166 |
| 6,241,323 B1 * | 6/2001 | Wagner et al. | 303/113.4 |
| 6,247,766 B1 | 6/2001 | Subramanian et al. | |
| 6,276,762 B1 * | 8/2001 | Katinas et al. | 303/11 |
| 6,290,306 B1 * | 9/2001 | Friedow | 303/113.3 |
| 6,349,995 B1 * | 2/2002 | Itoh et al. | 303/116.1 |
| 6,361,126 B1 * | 3/2002 | Pueschel et al. | 303/114.3 |
| 6,364,429 B1 * | 4/2002 | Roden et al. | 303/114.3 |
| 6,367,890 B1 | 4/2002 | Hachtel | |
| 6,389,349 B1 | 5/2002 | Hachtel | |
| 6,390,568 B1 * | 5/2002 | Tozu et al. | 303/114.3 |
| 6,464,307 B1 * | 10/2002 | Yoshino | 303/11 |
| 6,595,598 B2 | 7/2003 | Harris et al. | |
| 6,623,088 B2 * | 9/2003 | Roden et al. | 303/113.1 |
| 2002/0130549 A1 | 9/2002 | Harris | |

\* cited by examiner

*Primary Examiner*—Christopher P Schwartz
(74) *Attorney, Agent, or Firm*—Scott A. McBain

(57) ABSTRACT

The invention provides a method for controlling a vehicle with a braking system including a modulator pump. A first fluid line can communicate brake fluid from the master cylinder to a brake caliper. An isolation valve including a pressure bypass can be disposed along the fluid line between the master cylinder and the brake caliper. A second fluid line can extend from a first position along the first fluid line between the master cylinder and the isolation valve to a second position along the first fluid line between the isolation valve and the brake caliper. A modulating pump is disposed along the second fluid line to pump fluid to the brake caliper during a controlled brake event. The modulator pump is engaged to pump fluid to the brake caliper until the pressure in the first fluid line reached slightly below the predetermined pressure to prevent the isolation valve from opening in response to excessive pressure.

9 Claims, 2 Drawing Sheets

MODULATOR NOISE REDUCTION VIA MOTOR CONTROL

TECHNICAL FIELD

The invention relates to a braking system for a vehicle and, more specifically, the invention provides a method for controlling a brake pump to reduce noise, especially during driver braking.

BACKGROUND OF THE INVENTION

A braking system of a vehicle can include a control unit for exercising control over the braking system of the vehicle under certain conditions. For example, during movement of the vehicle the control unit can receive signals from various sensors and, based on a control program stored in memory, control the operation of various parts of the braking system including pumps and valves. Specifically, the controller can receive signals from sensors, wherein the signals correspond to existing driving conditions. The controller can receive the signals and quantify the existing driving conditions. These quantified conditions are compared to predetermined values by a processor of the control unit and command signals are emitted in response to these comparisons. Reasons for taking control of the braking system generally relate to enhancing or optimizing vehicle dynamics.

The braking system can include a modulator or modulating pump to apply fluid pressure to a controlled wheel. When the modulator is used to apply pressure to the controlled wheel, prime and isolation valves are energized and the pump motor is turned on. Excess fluid that is pulled from the master cylinder must be relieved in some manner. This normally occurs through the isolation valve when pumping forces overcome the force of the isolation valve and fluid returns to the master cylinder. The forced opening of the isolation valve may cause noise, especially when the master cylinder is generating pressure on the opposite side of the isolation valve, as during driver braking.

SUMMARY OF THE INVENTION

The present invention provides a method for increasing brake pressure including the step of pumping fluid to a brake caliper with a pump and discontinuing the pumping before the fluid pressure causes a bypass valve to open. The braking system can include a first line extending between a master cylinder and a brake caliper. A bypass or bypass-isolation valve can be positioned along the first fluid line between the master cylinder and the brake caliper. The bypass-isolation valve can be in a closed position and forced to an open position in response to a predetermined level of fluid pressure in the fluid line. A second fluid line can extend from the first fluid line to move fluid to the caliper around the bypass-isolation valve. A pump can be disposed along the second fluid line to pump fluid to the brake caliper.

Noise is generated when the bypass-isolation valve is forced to the open position by pump pressure. This noise is especially noticeable when master cylinder pressure is present. The present invention provides for stopping the pump substantially immediately prior to the forced opening of the bypass-isolation valve and reduces the likelihood that the valve will open. Noise generated by the braking system is reduced.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings, wherein like reference numerals refer to like parts throughout the several views and wherein.

DESCRIPTION OF THE PREFERRED EMBODIMENT

Figure 1:
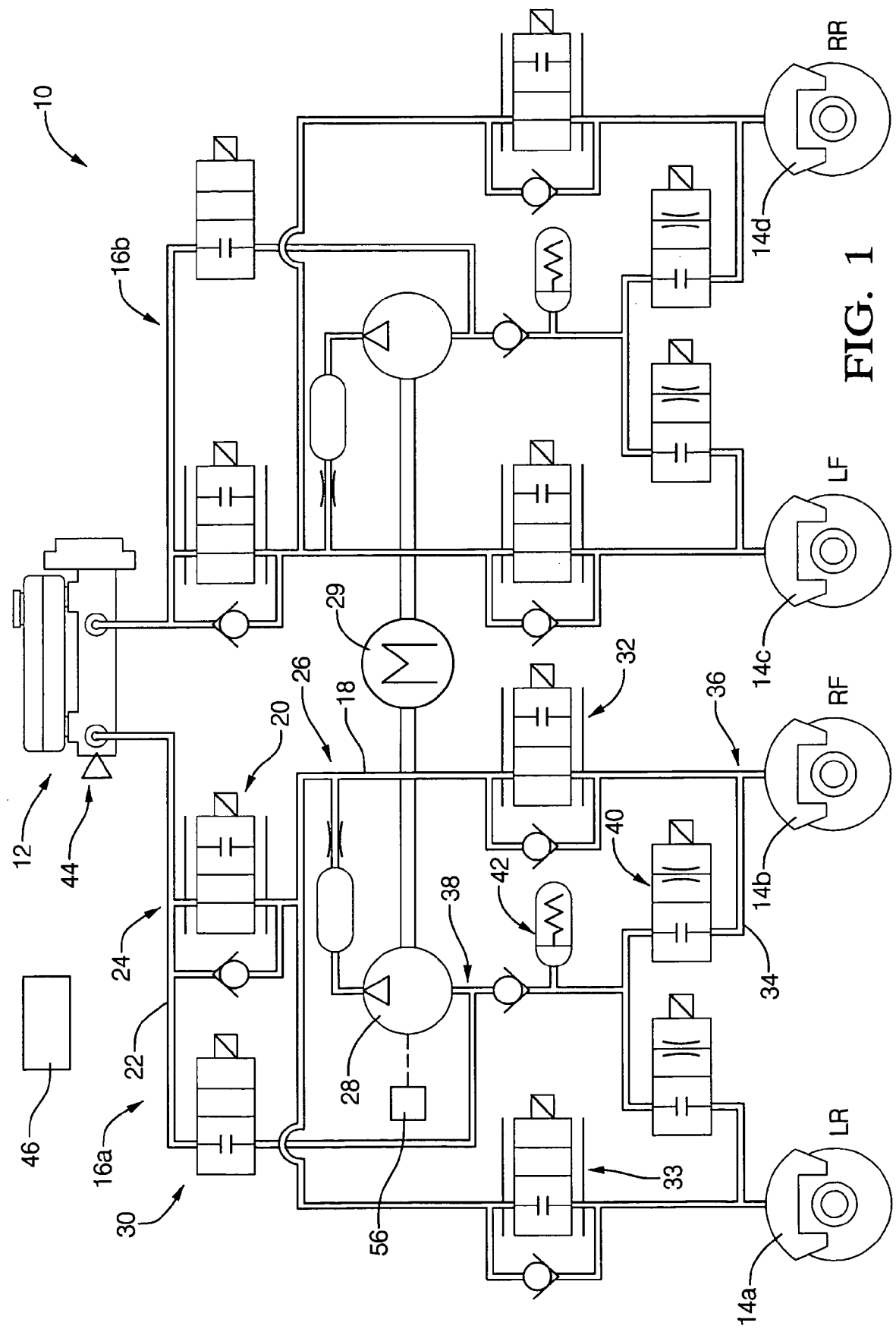
FIG. 1 is a schematic illustration of a braking system according to the exemplary embodiment of the invention.

Referring now to FIG. 1, a braking system 10 according to the exemplary embodiment of the invention includes a master cylinder 12 in fluid communication with a plurality of brake calipers 14a, 14b, 14c and 14d. The system 10 can define a four channel diagonal split having a first fluid circuit 16a between the master cylinder 12 and the calipers 14a and 14b and a second fluid circuit 16b between the master cylinder 12 and the brake calipers 14c and 14d. The structure of the fluid circuits 16a, 16b can be substantially similar and the components disposed along the first fluid circuit 16a can be substantially similar to the components disposed along the second fluid circuit 16b.

A first fluid line 18 places the master cylinder 12 and the brake caliper 14b in fluid communication with one another. A first valve 20 is disposed along the first fluid line 18 between the master cylinder 12 and the brake caliper 14b. The first valve 20 includes a pressure bypass valve such that the valve 20 is forced from a closed position to an open position in response to a predetermined fluid pressure in the first fluid line 18. In the exemplary embodiment of the invention shown in FIG. 1, the valve 20 is a solenoid bypass isolation valve set in the open position when de-energized. The valve 20 moves to the closed position when energized. When the valve 20 is in the closed position, an excessive fluid pressure difference across the valve 20, high pressure in the first fluid line 18 as compared to the pressure at point 24, can induce movement of the valve 20 to the open position. By way of example only, the isolation valve 20 can open when the pressure difference is greater than 500 psi.

A second fluid line 22 extends from a first position 24 along the first fluid line 18 between the valve 20 and the master cylinder 12 to a second position 26 along the first fluid line 18 between the valve 20 and the brake caliper 14b. A fluid pump 28 is disposed along the second fluid line 22 and powered by a motor 29. The pump 28 can pump brake fluid to the brake calipers 14a, 14b from the master cylinder 12 by pulling fluid through the valve 30 and pushing fluid out to position 26, feeding the calipers 14a and 14b. The pump 28 is disengaged substantially immediately prior to the fluid pressure in the first fluid line 18 reaching a predetermined pressure, the predetermined pressure being the pressure at which the valve 20 opens in response to the pressure in the first fluid line 18.

In the exemplary embodiment of the invention, a prime valve 30 is disposed along a second fluid line 22 between the pump 28 and the first position 24. The prime valve 30 is a solenoid valve set in the closed position when de-energized. The valve 30 moves to the open position when energized. The pump 28 can draw fluid from the master cylinder 12 through the open prime valve 30 during a controlled brake event.

The system 10 also includes a release valve and an apply valve positioned between the master cylinder 12 and each of the calipers 14a, 14b, 14c and 14d. The release and apply valves can enhance the controlled movement of fluid to the calipers. An apply valve 32 is disposed along the first fluid line 18 between the second position 26 and the caliper 14b. An apply valve 33 is disposed along the first fluid line 18 between the second position 26 and the caliper 14a. In the exemplary embodiment of the invention, the valves 32, 33 are solenoid bypass isolation valves set in the open position when de-energized. Valve 33 is shown in the closed position to enhance the clarity of the steps of the inventive method, set forth more fully below, but is normally open when de-energized. The valves 32, 33 move to the closed position when energized. When the valves 32, 33 are in the closed position, excessive fluid pressure in the first fluid line 18 can induce movement of the valve 32 or the valve 33 or valve 20 to the open position. But in the case when the valves 32 and 33 are both closed, fluid is not required at the caliper 14b and the pump 28 is not engaged.

A third fluid line 34 extends from a third position 36 along the first fluid line 18 between the valve 32 and the brake caliper 14b to a first position 38 along the second fluid line 22 between the pump 28 and the valve 30. A release valve 40 is disposed along the third fluid line 34. The valve 40 is a solenoid valve set in the closed position when de-energized. The valve 40 moves to the open position when energized. An accumulator 42 is disposed along the third fluid line 34 between the valve 40 and the first position 38.

A pressure sensor 44 is disposed along the first fluid line 18 between the valve 20 and the master cylinder 12. A controller 46 can communicate with the sensor 44 and control the valves 20, 30, 32, 40 and the pump 28. To enhance the clarity of FIG. 1, lines of communication between the controller and the sensor 44, the pump 28, and the valves 20, 30, 32 and 40 are not shown, although said lines of communication exist.

Figure 2:
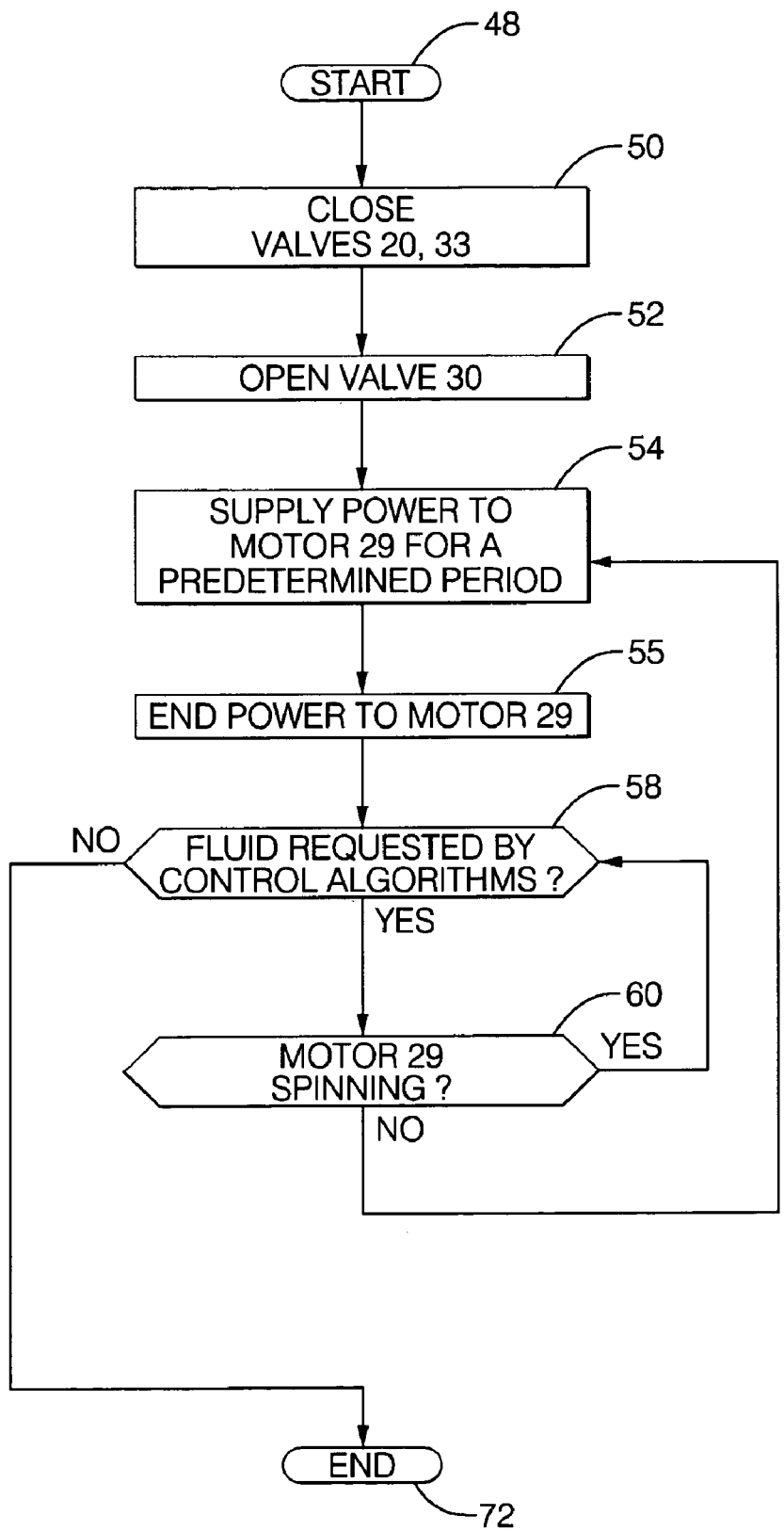
FIG. 2 is a simplified flow diagram illustrating the steps performed by the exemplary embodiment of the invention.

The process for executing a controlled brake event at the right front wheel according to the exemplary embodiment of the invention is shown in the simplified flow diagram of FIG. 2. This exemplary event focuses on applying to one caliper in which case the opposite caliper of the same fluid path will be prevented from receiving fluid by energizing the apply valve associated with that caliper, caliper 14a in this case. The process starts at step 48. At step 50, the controller 46 closes the valves 20, 33. The valve 33 is shown in FIG. 1 as closed to support the description of the inventive method; however, the valve 33 is normally open when in a de-energized position. The controller 46 opens the valve 30 at step 52. At step 54, the motor 29 is supplied electrical power for a predetermined period of time. This predetermined time is based on the known characteristics of the pump 28 and motor 29 combination. In response to the supply of electrical power to the motor 29, the pump 28 will move and fluid will be pumped to the caliper 14b. Fluid is pumped to the caliper 14b to increase the fluid pressure at the caliper 14b to a desired pressure or based upon fluid requirements of that wheel as determined by the controller 46. The predetermined period of time that power is supplied to the motor 29 can be a minimum amount of time required to insure that the motor 29 spins and begins the movement of fluid. For example, the pump motor 29 can be engaged for thirty milliseconds.

At step 55, the power supplied to the motor 29 is stopped. As a result of momentum, the motor 29 will continue to spin and the pump 28 will continue to pump fluid in response to movement of the motor 29. The motor will continue to spin until the momentum, generated during the period of time when power is supplied to the motor 29, is exhausted.

At step 58, the controller 46 determines whether fluid is requested at the caliper 14b based on the control algorithms stored in the memory of the controller. Fluid can be requested at the caliper 14b if the fluid pressure at the caliper 14b is lower than desired. Fluid is requested in order to increase braking force applied by the caliper 14b at the wheel.

If fluid is not requested at the caliper 14b, the process ends at step 72. If fluid is requested at the caliper 14b based on the control algorithms, the process continues to step 60. Step 60 determines if the motor 29 is still spinning. In other words, step 60 determines if the momentum of the motor 29 has been exhausted. A sensor 56 can be associated with the motor 29 to determine motor speed; in the exemplary embodiment, the voltage across the motor 29 is sensed to perform this function but other sensing strategies are possible. The voltage across the motor 29 corresponds to the spinning of the motor 29. For example, if the sensor 56 detects zero voltage across the motor 29, the motor 29 is not spinning. Likewise, if the sensor 56 detects voltage across the motor 29, the motor 29 is spinning.

The controller 46 can communicate with the sensor 56 and control the pump motor 29 in response to signals received from the sensor 56. For example, if the sensor 56 senses zero voltage across the motor 29 at step 60, the controller 46 can return to step 54 and power can be supplied to spin the motor 29 for a predetermined period. If the motor 29 is spinning, even though the motor 29 was turned off at step 55, the pump 28 will be pumping fluid and the process returns to step 58. In this way, the pump motor 29 is continuously pulsed to provide fluid to one of the calipers 14a, 14b as needed without forcing the isolation valve 20 open. In cases when pressure is to be maintained or released at the caliper 14b, the pump motor 29 is not engaged.

The minimum amount of time for engaging the pump motor 29, or the predetermined period, can be adjusted during the controlled brake event. For example, the predetermined time period during a first completion of step 54 can be greater than, less than, or equal to the predetermined period during a subsequent completion of step 54. Vehicle operating conditions can change during a controlled braking maneuver and the present invention can accommodate changes in operating conditions.

Alternatively, the controller 46 will control the pump 28 in response to the fluid pressure sensed by the sensor 44 and a control program stored in the memory of the controller 46. For example, the pump 28 can be controlled in response to a vehicle stability enhancement program, a traction control system, an anti-lock braking system, and/or a panic brake assist program. The pump 28 can be pulsed in an on-off fashion or continuously engaged as determined by the master cylinder pressure, pump-motor voltage, and fluid demands as determined by the control algorithm. In the preferred embodiment of the invention, the pump motor 29 is pulsed on and off to prevent the isolation valve from being forced open by pressure in line 18. The on-off pulses are based on pump voltage response and pressure build requirements as indicated by the controller 46.

While the invention has been described as referenced to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out the invention, but that the invention will include all embodiments falling within the scope of the claims.

The invention claimed is:

1. A method for controlling a vehicle with a braking system having a first fluid line extending between a master cylinder and a brake caliper and a bypass-isolation valve disposed along the first fluid line between the master cylinder and the brake caliper wherein the bypass-isolation valve being moveable from a closed position to an open position in response to a predetermined fluid pressure in the first fluid line, a second fluid line extending from a first position along the first fluid line between the pressure-bypass valve and the master cylinder to a second position along the first fluid line between the pressure-bypass valve and the brake caliper, a fluid pump disposed along the second fluid line, the method comprising the steps of:
   pumping fluid to the brake caliper with the pump to execute a controlled brake event wherein fluid pressure at the brake caliper is increased to a desired pressure; and
   discontinuing the pumping during the controlled brake event prior to the fluid pressure in the first fluid line reaching the predetermined pressure and prior to the bypass-isolation valve opening and prior to completion of the controlled brake event.

2. The method of claim 1 including the steps of:
   disposing a prime valve along the second fluid line between the fluid pump and the first position; and
   biasing the prime valve to a closed position.

3. The method of claim 2 including the steps of:
   closing the bypass-isolation valve prior to the pumping step; and
   opening the prime valve prior to the pumping step.

4. The method of claim 3 including the steps of:
   sensing a first fluid pressure sensor along the first fluid line; and
   controlling the pump in response to the sensing step.

5. The method of claim 4 including the steps of:
   extending a third fluid line from a third position disposed along the first fluid line between the second position and the brake caliper to a first position along the second fluid line between the pump and the prime valve;
   disposing a bypass-apply valve along the first fluid line between the brake caliper and the sensor;
   disposing a release valve along the third fluid line between the first position and the third position; and
   disposing a fluid accumulator along the third fluid line between the first position and the release valve.

6. The method of claim 1 including the steps of:
   second pumping fluid to the brake caliper with the pump after said discontinuing step and prior to completion of the controlled brake event; and
   second discontinuing the pumping during the controlled brake event prior to the fluid pressure in the first fluid line reaching the desired pressure and the predetermined pressure and prior to the bypass-isolation valve opening.

7. The method of claim 1 wherein said pumping step is further defined as:
   pulsing the pump during the controlled brake event to provide fluid to the brake caliper as needed without forcing the isolation valve open.

8. The method of claim 1 wherein said pumping step further comprises the step of:
   supplying electrical power to a motor of the pump for a predetermined period of time.

9. The method of claim 8 wherein said supplying step further comprises the step of:
   selecting the predetermined period of time to be a minimum amount of time required to insure that the motor spins and that the pump begins the movement of fluid.

* * * * *